(12) United States Patent
Billig

(10) Patent No.: US 10,595,543 B2
(45) Date of Patent: Mar. 24, 2020

(54) SYSTEM AND METHOD FOR PRODUCING ROLLED ICE CREAM

(71) Applicant: Sweet Charlie's LLC, Philadelphia, PA (US)

(72) Inventor: Steven Billig, Cherry Hill, NJ (US)

(73) Assignee: Sweet Charlie's Holdings, LLC, Philadelphia, PA (US)

( * ) Notice: Subject to any disclaimer, the term of this patent is extended or adjusted under 35 U.S.C. 154(b) by 137 days.

(21) Appl. No.: 15/804,399

(22) Filed: Nov. 6, 2017

(65) Prior Publication Data

US 2018/0125089 A1    May 10, 2018

Related U.S. Application Data

(60) Provisional application No. 62/418,624, filed on Nov. 7, 2016.

(51) Int. Cl.
| | |
|---|---|
| *A23G 9/28* | (2006.01) |
| *F25D 17/02* | (2006.01) |
| *A23G 9/22* | (2006.01) |
| *F25D 29/00* | (2006.01) |
| *F25D 31/00* | (2006.01) |
| *F25B 49/02* | (2006.01) |
| *F25B 41/04* | (2006.01) |
| *F25D 23/00* | (2006.01) |
| *A23G 9/18* | (2006.01) |

(52) U.S. Cl.
CPC ............. *A23G 9/28* (2013.01); *A23G 9/18* (2013.01); *A23G 9/228* (2013.01); *F25B 41/04* (2013.01); *F25B 49/02* (2013.01); *F25D 17/02* (2013.01); *F25D 23/006* (2013.01); *F25D 29/001* (2013.01); *F25D 31/001* (2013.01); *F25B 2400/0409* (2013.01)

(58) Field of Classification Search
CPC ... A23G 9/28; A23G 9/22; A23G 9/30; A23G 9/42; A23G 9/305; A23G 9/228; A23G 9/12; F25C 5/08; F25C 5/10; F25C 1/04; F25C 1/12; F25B 47/022; F25B 49/022; F25B 41/043

See application file for complete search history.

(56) References Cited

U.S. PATENT DOCUMENTS

| | | | | |
|---|---|---|---|---|
| 4,476,146 | A * | 10/1984 | Manfroni | A23G 9/305 426/522 |
| 4,563,880 | A * | 1/1986 | Cipelletti | A23G 9/30 62/155 |
| 2008/0075826 | A1 * | 3/2008 | Jin | A23G 9/04 426/565 |

(Continued)

*Primary Examiner* — Emmanuel E Duke
(74) *Attorney, Agent, or Firm* — Fox Rothschild LLP

(57) ABSTRACT

A system and method for producing rolled ice cream comprising a housing, a plate member located on a top surface of the housing, a compressor configured to provide compressed refrigerant, and a condenser coupled to the compressor. The condenser is configured to provide cooled refrigerant to a bottom surface of the plate member via an outlet tube. The system further comprises a balance valve, wherein the balance valve is configured to enable the refrigerant to bypass the outlet tube while the compressor and condenser are still operational when it is determined that the plate member has reached a predetermined minimum operational temperature.

20 Claims, 4 Drawing Sheets

(56) References Cited

U.S. PATENT DOCUMENTS

2014/0212559 A1* 7/2014 Cocchi ................ A23G 9/224
426/519
2014/0238062 A1* 8/2014 Sul ..................... F25B 47/022
62/228.2

* cited by examiner

SYSTEM AND METHOD FOR PRODUCING ROLLED ICE CREAM

RELATED APPLICATION AND CLAIM OF PRIORITY

This patent document claims priority to U.S. Provisional Patent Application No. 62/418,624, filed Nov. 7, 2016. The disclosure of the priority application is fully incorporated by reference.

BACKGROUND

The present disclosure relates to a system for producing rolled ice cream. More particularly, the disclosure relates to a system for producing rolled ice cream comprising a balance valve configured to allow for the bypass of an outlet tube delivering refrigerant to a plate surface. The system enables a compressor to remain operational, even when a predetermined minimum operating temperature is met.

Ice cream and other frozen dairy products have long been popular, and a relatively recent offering known as rolled ice cream has built upon this popularity. The process to make rolled ice cream generally involves pouring a mixture of liquefied cream and/or other ingredients onto a top surface of a super-chilled plate, which quickly freezes the cream mixture as it is evenly spread upon the plate. The plate is chilled via a refrigerant system that includes a compressor and a condenser, wherein the compressor and condenser deliver a refrigerant gas to a bottom surface of the plate through a tube or series of tubes. The frozen cream may then be scraped from the plate's top surface in the form of one or more rolls, which are then served directly to the customer in an appropriate container.

As the rolled ice cream is made specifically for the customer on-the-spot, the addition of artificial stabilizing agents and other artificial ingredients that are found in many conventional ice cream products may not be necessary. Furthermore, the rolled ice cream may not be subjected to the cyclical thawing and refreezing that is often experienced by conventional ice cream products, which diminishes the texture and appearance of those ice cream products.

As the plate upon which the cream mixture is poured must be maintained within an appropriate temperature range in order to allow the mixture to rapidly freeze, active control of the various components of the system, whether manual or automatic, is needed. Typically, the top surface of the plate is maintained within a predetermined temperature range (e.g., −19° to −21° C.) when the system is in operation. Such a temperature range allows the cream mixture to freeze in a timely manner, while still enabling the operator to manipulate and spread the mixture prior to a complete freeze.

In order for the plate to be maintained within the predetermined temperature range, the system must limit the amount of time the plate is subjected to the refrigerant supplied by the condenser. As such, known systems have simply shut down the compressor when a predetermined minimum operational temperature of the plate (e.g., −21° C.) is reached, which stops the flow of refrigerant to the bottom surface of the plate. Once the plate reaches a predetermined maximum operational temperature (e.g., −19° C.), the compressor is instructed to turn on again, thereby again supplying refrigerant to the plate. In this fashion, the compressor may turn on and off numerous times throughout the process of making a single order of rolled ice cream.

While such a configuration may enable the plate to be maintained within a predetermined operational temperature range, there are several disadvantages to repeatedly turning the compressor on and off. Namely, the initial burst of gas delivered from the condenser after the compressor is turned back on is actually a hot gas, similar to the initial burst of hot air delivered from a vehicle's air conditioning unit when first activated. Thus, if a compressor is shut down in the middle of the ice cream making process, only to be turned back on during that same process, the plate experiences a short burst of hot gas at a bottom surface thereof. The warming of the plate, however brief, may negatively affect the consistency of the ice cream, and may result in need for the process to be repeated.

Accordingly, this document describes a system that is intended to addresses the issues discussed above and/or other issues.

SUMMARY

In at least one aspect, the present disclosure provides a system for producing rolled ice cream. The system comprises a housing, a plate member located on a top surface of the housing, a compressor configured to provide compressed refrigerant, and a condenser coupled to the compressor. The condenser is configured to provide cooled refrigerant to a bottom surface of the plate member via an outlet tube. The system further comprises a balance valve, wherein the balance valve is configured to enable the refrigerant to bypass the outlet tube while the compressor and condenser are still operational when it is determined that the plate member has reached a predetermined minimum operational temperature.

According to an aspect of the present disclosure, the system further comprises a system controller, wherein the system controller is configured to receive a predetermined minimum operational temperature setting and a predetermined maximum operational temperature setting, and further wherein the system controller is configured to control the balance valve based upon the predetermined minimum operational temperature and a predetermined maximum operational temperature.

In another aspect of the present disclosure, the system also comprises a temperature setting/indicator interface on a surface of the housing, wherein the temperature setting/indicator interface is coupled to the system controller and enables the predetermined minimum operational temperature setting and the predetermined maximum operational temperature setting to be selected by the operator.

In yet another aspect of the present disclosure, a method of producing rolled ice cream is disclosed. The method comprises providing a plate member on a top surface of a housing, providing a compressor, the compressor configured to compress a refrigerant, and providing a condenser coupled to the compressor, the condenser configured to provide the refrigerant to a bottom surface of the plate member via an outlet tube. The method further includes providing a balance valve in-line with the outlet tube between the condenser and the bottom surface of the plate member, determining a predetermined minimum operational temperature setting of the plate member and a predetermined maximum operational temperature setting of the plate member, and bypassing a connection between the condenser and the outlet tube via the balance valve when it is determined that the predetermined minimum operational temperature has been reached.

In another aspect of the present disclosure, a method of producing rolled ice cream is disclosed, the method including providing a plate member on a top surface of a housing, providing a compressor, the compressor configured to compress a refrigerant, and providing a condenser coupled to the compressor, the condenser configured to provide the refrigerant to a bottom surface of the plate member via an outlet tube. The method further includes providing a balance valve in-line with the outlet tube between the condenser and the bottom surface of the plate member, determining if the compressor has been restarted from a shut-off condition, and bypassing a connection between the condenser and the outlet tube via the balance valve when it is determined that the compressor has been restarted from a shut-off condition.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "distal", "proximal", "vertical", "horizontal", "front", "rear", "top", and "bottom" are not intended to limit the invention to a particular direction or orientation, but instead are only intended to denote relative positions, or positions corresponding to directions shown when a system for producing rolled ice cream is oriented as shown in the Figures.

Figure 1:
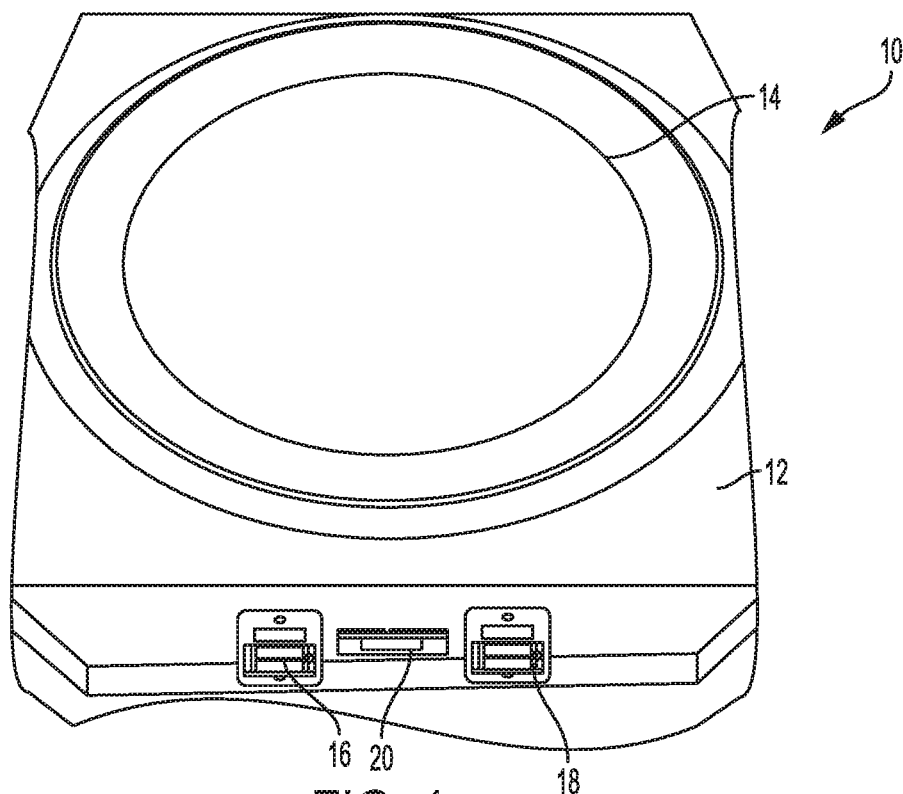
FIG. 1 is top perspective view of a system for producing rolled ice cream in accordance with an aspect of the disclosure.

Referring to FIG. 1, a system 10 for producing rolled ice cream in accordance with an aspect of the present disclosure is illustrated. System 10 comprises a housing 12, which is preferably a fully- or partially-enclosed housing having side surfaces and a top surface. The housing 12 may be formed of any appropriate material, such as stainless steel, aluminum, etc. Additionally, housing 12 may include insulating panels configured to provide insulation to the components therein.

On a top surface of housing 12 is a plate member 14. Like housing 12, plate member 14 may be formed of any appropriate, food-safe material, such as stainless steel, aluminum, etc. As will be described further below, plate member 14 may be coupled to one or more refrigerant tubes configured to cool plate member 14 to within a predetermined temperature range. For example, plate member 14 may be cooled to within a range of −19° to −21° C. However, it is to be understood that this stated range is not limiting and that plate member 14 may be cooled to any appropriate temperature deemed effective for producing rolled ice cream.

Figure 2:
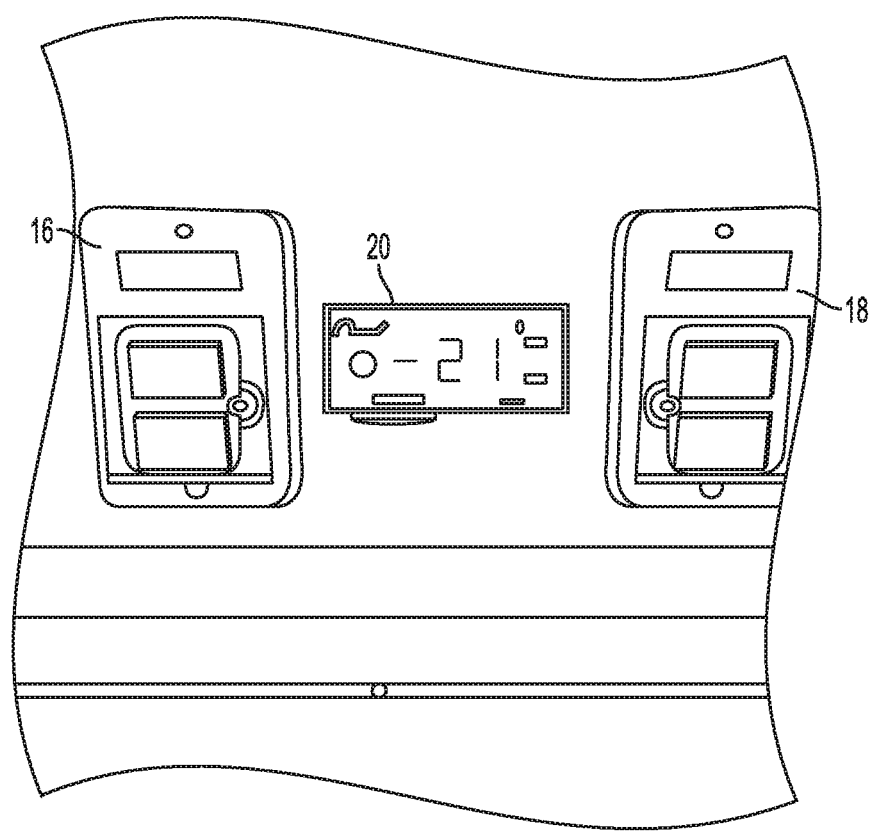
FIG. 2 is a side view of switch and indicator components of the system of FIG. 1.

System 10 further comprises respective switches 16, 18 and temperature setting/indicator interface 20, as shown in FIGS. 1-2. Switch 16 may be an on/off switch providing power to the entire system, while switch 18 may be defrost switch. It is to be understood that switches 16, 18 and/or temperature setting/indicator interface 20 may be formed of any appropriate user interface, such as, e.g., one or more rocker switches, one or more soft keys, one or more touch-screen displays, etc. As will be described further herein, the plate member 14 may need to be intermittently defrosted in order to clean ingredients (e.g., unscraped ice cream, etc.) from the plate member 14 between customers, or defrost switch 18 may be manually controlled by operator during the ice cream making process to slow the freezing process and/or alter the consistency of the cream mixture. By pressing the defrost switch 18, the cold refrigerant bypasses the tube(s) in contact with the plate member 14, thereby raising the temperature of the surface of plate member 14 and melting any remaining product remaining on the surface of plate member 14. In fact, in accordance with some embodiments, hot gasses may be delivered to the plate member 14 when the defrost switch 18 is depressed so as to expedite the melting (and, therefore, cleaning) process. While defrost switch 18 is shown in FIGS. 1-2 as being located on a side of housing 12, it is to be understood that defrost switch 18 could be mounted at an alternative location on housing 12 and/or could be a foot pedal, knee pedal, etc., for hands-free engagement by the operator. As is also shown in FIG. 2, temperature setting/indicator interface 20 enables the operator to set the predetermined minimum and maximum operating temperatures.

Figure 3:
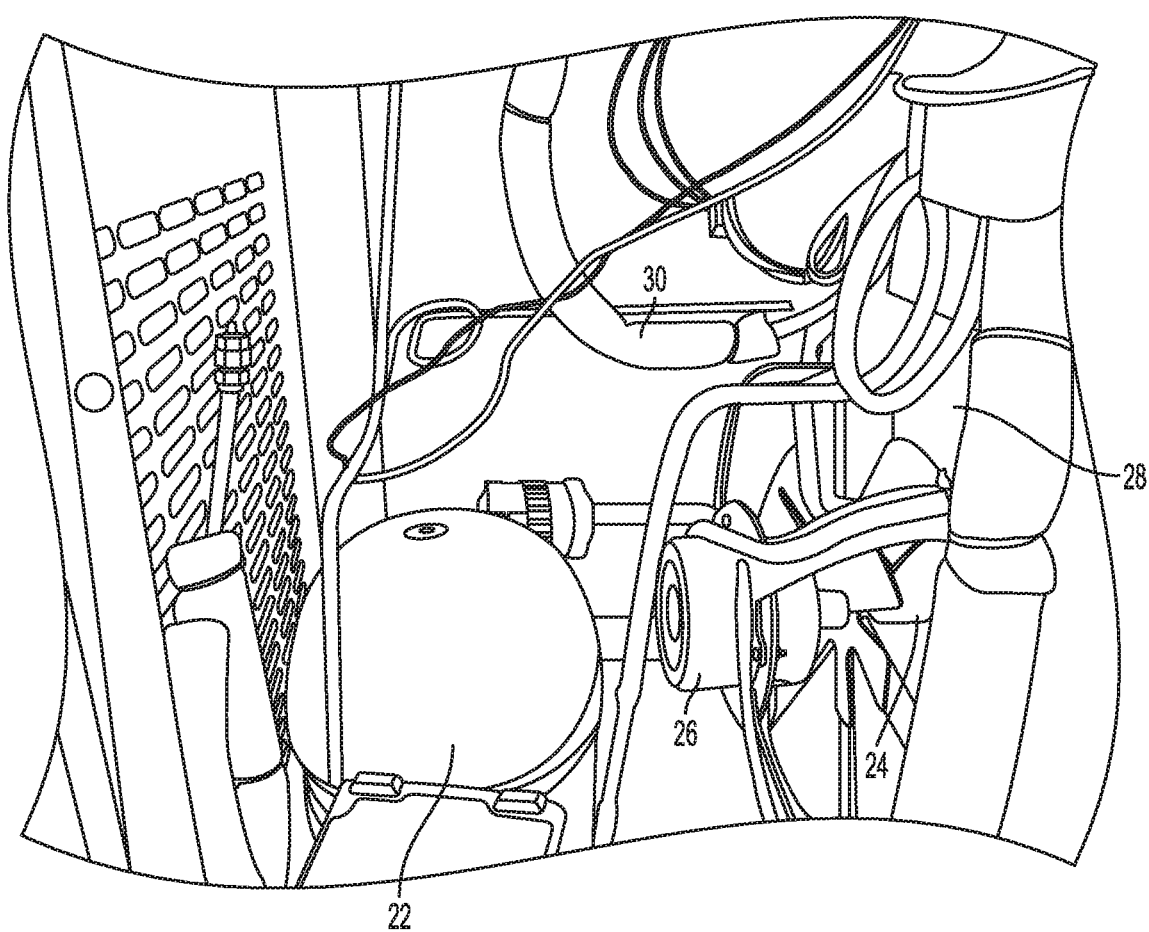
FIG. 3 is a side view of internal components of the system of FIG. 1.

Next, referring to FIG. 3, various internal components of system 10 are shown. A compressor 22 may be coupled via a series of tubes (e.g., copper tubes) to a condenser 28, which is cooled by a fan 24 driven by an electric motor 26. A refrigerant gas is introduced to the compressor 22 through an inlet tube, wherein the compressor 22 compresses the refrigerant gas, thereby increasing the temperature and pressure of the refrigerant gas. The pressurized refrigerant gas is then delivered to the condenser 28 via another tube. The fan 24, when driven by electric motor 26, removes heat from the condenser 28, thereby dropping the temperature of the refrigerant gas to a point where some or all of the refrigerant gas becomes liquefied. The liquefied refrigerant then exits the condenser 28 and passes through an expansion valve (not shown), which vaporizes the cold, liquefied refrigerant. The vaporized refrigerant is then provided to a bottom surface 48 of the plate member 14 via an outlet tube 30 so as to provide a sufficiently cold surface upon which ice cream may be rolled. Portions of the outlet tube 30 may be coiled so as to be in substantial contact with the bottom surface 48 of plate member 14, which may provide even cooling along the surfaces of the plate member 14.

Figure 4:
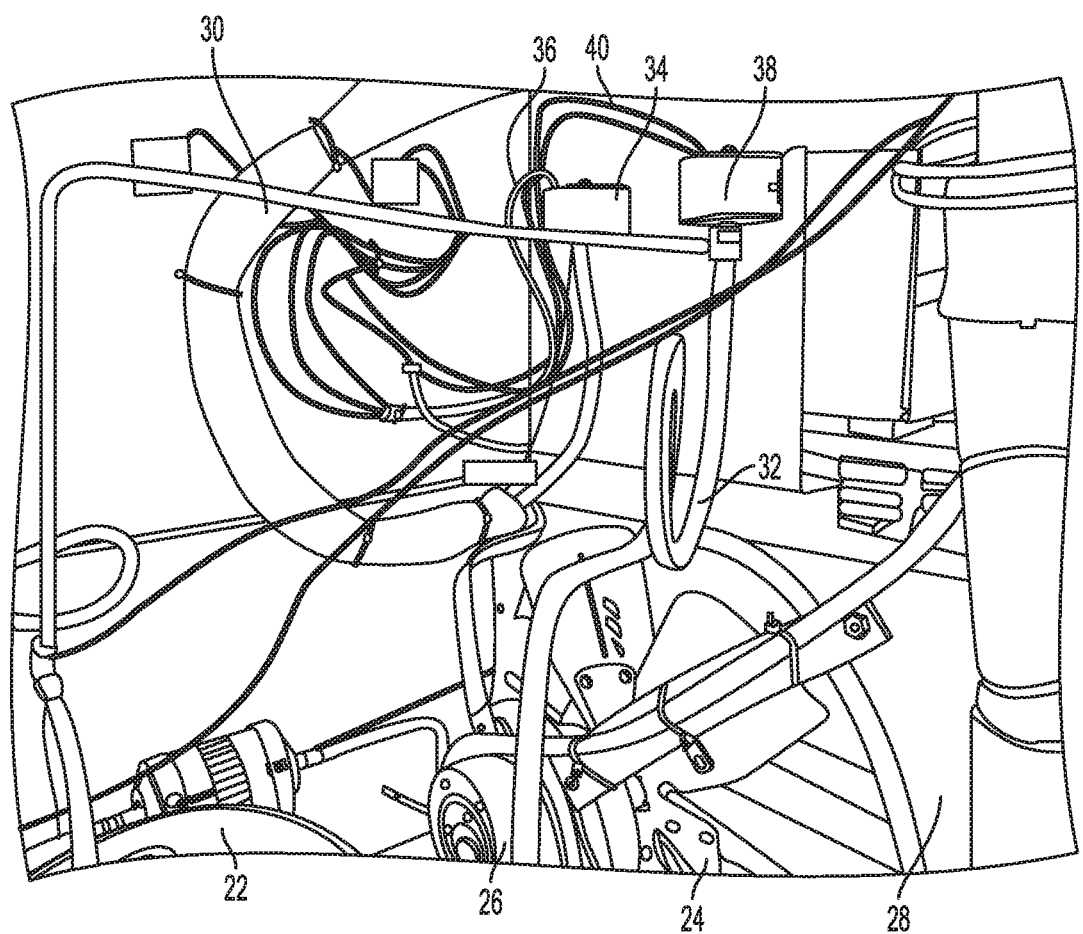
FIG. 4 is a perspective view of the internal components of the system of FIG. 1.

Referring now to FIG. 4, additional components of system 10 are shown. A normally-closed defrost valve 34 is shown as being in-line with outlet tube 30. Defrost valve 34 may be any appropriate valve, such as a solenoid valve. When the operator activates the defrost switch 18 (and/or a foot pedal, etc.), the defrost valve 34 may open, thereby introducing non-condensed vapor from the refrigerant into the outlet tube 30. This introduction of vapor may rapidly increase the temperature seen by the plate member 14 such that the ingredients remaining on the top surface of plate member 14 are able to melt to be further manipulated and/or cleaned off of the top surface of plate member 14. Leads 36 connect the defrost valve 34 to the defrost switch 18 such that the defrost valve 34 may be activated via operator input.

Figure 5:
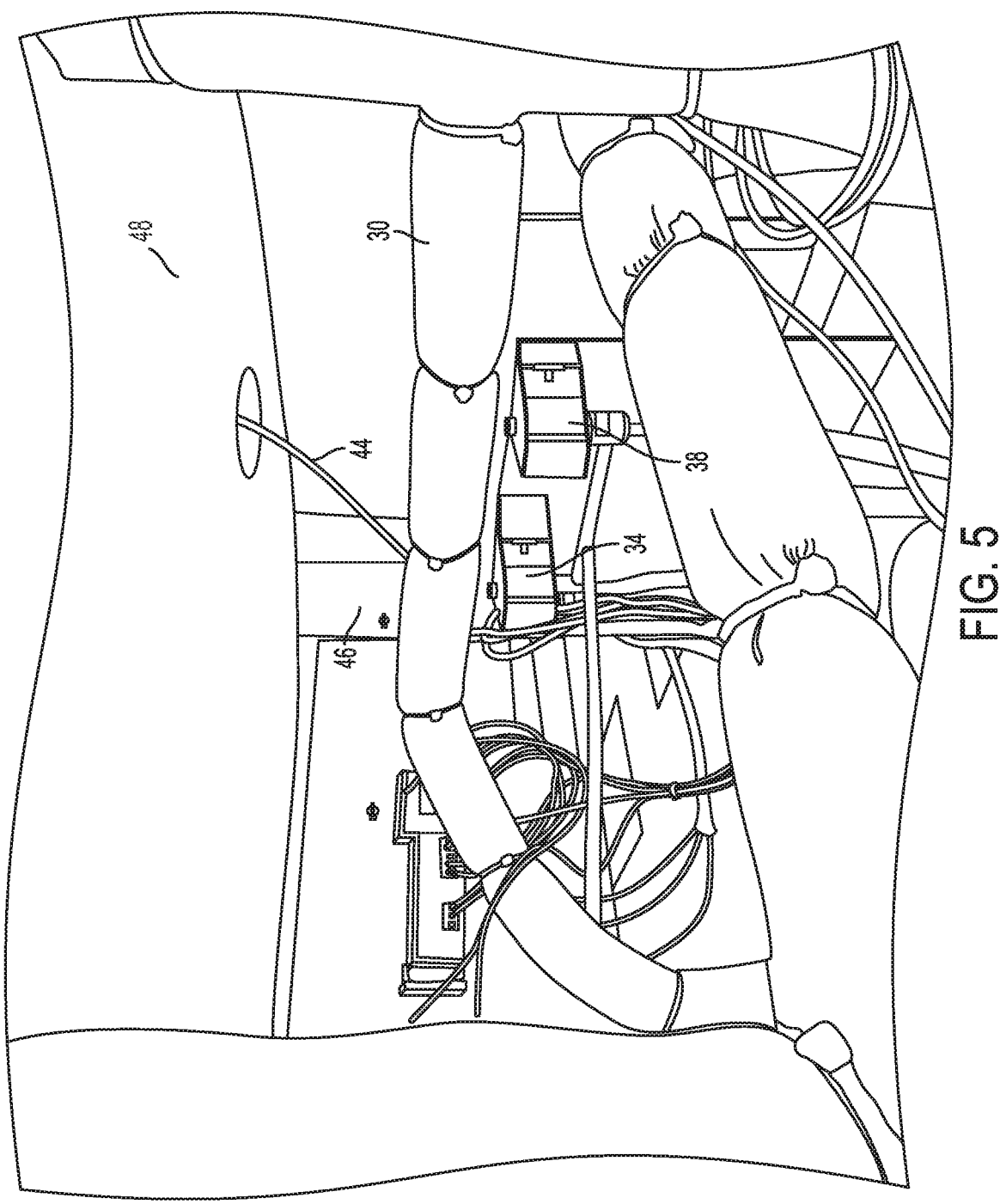
FIG. 5 is another perspective view of the internal components of the system of FIG. 1.

In addition to defrost valve 34, system 10 further comprises a balance valve 38. Like defrost valve 34, balance valve 38 may comprise any appropriate valve, such as a solenoid valve. However, unlike defrost valve 34, balance valve 38 is not configured for manual activation by the operator. Rather, balance valve 38 is configured to be controlled by a system controller 46, shown in FIG. 5, and may be in communication with system controller 46 via leads 40. System controller 46 may include any appropriate controller device, such as, e.g., a microcontroller.

System controller 46 may be configured to monitor the surface temperature of the plate member 14 via thermometer lead 44 coupled to a thermometer (not shown) placed on or near a surface of plate member 14. Furthermore, system controller 46 may be in communication with the temperature setting/indicator interface 20 shown in FIG. 2 such that user-defined temperature settings may be monitored by the system controller 46.

In the event that the user-defined, predetermined minimum operational temperature (for example, less than −20° C., e.g., −21° C.) is reached on a surface of plate member 14, system controller 46 may be configured to activate (i.e., open) balance valve 38. By opening balance valve 38, refrigerant gases that would normally be delivered to the plate member 14 bypass outlet tube 30, thereby bypassing the plate member 14, as well. The refrigerant gases simply return to the compressor 22 and are looped through the system without being delivered to the plate member 14 for cooling.

In this way, the plate member 14 is able to slowly increase in temperature from its predetermined minimum operational temperature (e.g., −21° C.) toward its predetermined maximum operational temperature (for example, greater than or equal to −20° C., e.g., −19° C.). When it is determined by system controller 46 that the predetermined maximum operational temperature has been reached, the system controller 46 may close balance valve 38, thereby restoring the flow of cold refrigerant gases to the plate member 14 via outlet tube 30.

Through the use of balance valve 38, system 10 is able to provide continual operation of compressor 22 and condenser 28, even when cold refrigerant gases are not being passed to the plate member 14. As such, unlike prior systems, compressor 22 and condenser 28 do not need to be shut down when the plate member 14 reaches its minimum operational temperature, but instead remain operational until manual shut down by the operator. Accordingly, compressor 22 does not need to be restarted upon reaching a maximum operational temperature. Rather, balance valve 38 is simply closed, restoring the loop of cold refrigerant gases being provided to plate member 14. As compressor 22 does not need to be restarted, the initial hot burst of gases from compressor 22 may be avoided, thereby similarly avoiding undesirable heating of plate member 14 during compressor restart.

Alternatively and/or additionally, balance valve 38 may also be configured to prevent warm gases from reaching plate member 14 in the event that compressor 22 is restarted after having been shut down for any reason. As noted above, in the event that a conventional compressor is turned on after being shut down, warm gases may be initially expelled for a certain period of time (e.g., 3-8 seconds), thereby warming the plate member over that same period of time. However, in accordance with an aspect of the disclosure, balance valve 38 may be opened in the event that compressor 22 is restarted for any reason, thereby diverting any warm initial gases so as to bypass outlet tube 30 and, by extension, plate member 14. The temperature of the output refrigerant gases may be determined and monitored via, for example, one or more temperature sensors (not shown). When the output refrigerant gases have reached a suitable operational temperature after compressor 22 is restarted, the system may close balance valve 38, thereby providing the cold refrigerant gases to the plate member 14.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A system for producing rolled ice cream, the system comprising:
    a housing;
    a plate member located on a top surface of the housing;
    a compressor configured to provide compressed refrigerant;
    a condenser coupled to the compressor, wherein the condenser is configured to provide cooled refrigerant to a bottom surface of the plate member via an outlet tube;
    a balance valve positioned in-line with the outlet tube between the condenser and the bottom surface of the plate member, wherein the balance valve is configured to enable the refrigerant to bypass both the outlet tube and the bottom surface of the plate member while the compressor and condenser are still operational when it is determined that the plate member has reached a predetermined minimum operational temperature; and
    a system controller configured to automatically control the balance valve when it is determined that the plate member has reached the predetermined minimum operational temperature.

2. The system of claim 1, wherein the system controller is configured to receive a predetermined minimum operational temperature setting and a predetermined maximum operational temperature setting, and further wherein the system controller is configured to control the balance valve based upon the predetermined minimum operational temperature and the predetermined maximum operational temperature.

3. The system of claim 2, further comprising a temperature setting/indicator interface on a surface of the housing, wherein the temperature setting/indicator interface is coupled to the system controller and is configured to enable the predetermined minimum operational temperature setting and the predetermined maximum operational temperature setting to be selected by the operator.

4. The system of claim 2, wherein the predetermined minimum operational temperature setting is less than −20° C., and further wherein the predetermined maximum operational temperature setting is greater than or equal to −20° C.

5. The system of claim 1, wherein the balance valve is a solenoid valve.

6. The system of claim 1, wherein the balance valve is not manually controllable by an operator.

7. The system of claim 1, further comprising a defrost valve, wherein the defrost valve is controllable by an operator to provide heated gas to the bottom surface of the plate member via the outlet tube.

8. The system of claim 1, wherein the plate member is formed of stainless steel.

9. A method of producing rolled ice cream, the method comprising:
providing a plate member on a top surface of a housing;
providing a compressor, the compressor configured to compress a refrigerant;
providing a condenser coupled to the compressor, the condenser configured to provide the refrigerant to a bottom surface of the plate member via an outlet tube;
providing a balance valve in-line with the outlet tube between the condenser and the bottom surface of the plate member;
determining a predetermined minimum operational temperature setting of the plate member and a predetermined maximum operational temperature setting of the plate member;
detecting a temperature of the plate member; and
using a system controller, automatically bypassing a connection between the condenser and the bottom surface of the plate member via the balance valve when it is determined that the predetermined minimum operational temperature has been reached such that refrigerant is not provided to the bottom surface of the plate member.

10. The method of claim 9, further comprising reestablishing the connection between the condenser and the bottom surface of the plate member when it is determined that the predetermined maximum operational temperature has been reached.

11. The method of claim 9, wherein the compressor and the condenser remain operational when the connection between the condenser and the bottom surface of the plate member is bypassed via the balance valve.

12. The method of claim 9, further comprising bypassing the connection between the condenser and the bottom surface of the plate member via the balance valve if the compressor is restarted from shut-off condition.

13. The method of claim 12, further comprising reestablishing the connection between the condenser and the bottom surface of the plate member when it is determined that the predetermined maximum operational temperature has been reached.

14. The method of claim 9, further comprising providing a defrost valve in-line with the outlet tube.

15. The method of claim 14, further comprising bypassing a connection between the condenser and the outlet tube via the defrost valve.

16. The method of claim 15, further comprising manually activating a defrost switch to activate the defrost valve to enable bypassing of the connection between the condenser and the outlet tube.

17. A method of producing rolled ice cream, the method comprising:
providing a plate member on a top surface of a housing;
providing a compressor, the compressor configured to compress a refrigerant;
providing a condenser coupled to the compressor, the condenser configured to provide the refrigerant to a bottom surface of the plate member via an outlet tube;
providing a balance valve in-line with the outlet tube between the condenser and the bottom surface of the plate member;
detecting a temperature of the plate member;
determining if the compressor has been restarted from a shut-off condition; and
using a system controller, automatically bypassing a connection between the condenser and the bottom surface of the plate member via the balance valve when it is determined that the compressor has been restarted from a shut-off condition such that refrigerant is not provided to the bottom surface of the plate member.

18. The method of claim 17, further comprising determining a predetermined maximum operational temperature setting of the plate member and reestablishing the connection between the condenser and the bottom surface of the plate member when it is determined that the predetermined maximum operational temperature has been reached.

19. The method of claim 17, further comprising providing a defrost valve in-line with the outlet tube and bypassing a connection between the condenser and the outlet tube via the defrost valve.

20. The method of claim 19, further comprising manually activating a defrost switch to activate the defrost valve to enable bypassing of the connection between the condenser and the outlet tube.

* * * * *